United States Patent Office 3,065,249
Patented Nov. 20, 1962

3,065,249
PROCESS OF REFINING FATS AND OILS
Manoli Repapis, Seattle, Wash.
(25 Panormou St., Athens 603, Greece)
No Drawing. Filed Apr. 7, 1961, Ser. No. 101,374
8 Claims. (Cl. 260—425)

The present invention relates to the alkali-refining of fatty glyceride stocks of vegetable and animal origin in the presence of a small amount of urea to reduce losses experienced upon treatment with aqueous alkaline solutions to separate free fatty acids and other impurities. In certain preferred embodiments, the invention is directed to the alkali-refining of soybean oil and cottonseed oil in the presence of a small amount of urea.

The alkali-refining of fatty glyceride stocks has long been practiced, and these processes are described in detail in the literature and form no part of the present invention.

Generally, alkali-refining involves di-phasic separation of an aqueous phase containing undesirable impurities, and a refined oil phase. The phases may be allowed to separate by gravity, as in kettle refining, or may be separated by centrifugal means. The alkali neutralizes the free fatty acids to form soaps, which separate in the aqueous phase along with other impurities. There is usually some saponification of the neutral glycerides and some entrainment of neutral oil in the soaps formed. The art is confronted with the problem of minimizing these losses of neutral oil, which are a serious economic factor in large scale refining operations. This is especially true in batch or kettle refining, but the invention is also of value when centrifugal separation is used, either in a batch or continuous process.

For convenience in understanding the invention, it may be stated that in batch refining, a measured amount of oil with a quantity of aqueous alkali, slightly in excess of that required to fully neutralize the free fatty acids contained therein, are mixed in a kettle. When the oil process is to be practised at elevated temperatures, the oil is heated prior to the addition of the aqueous alkali. In the dry method, the soap stock is allowed to settle at the bottom of the kettle and then recovered in a solid or semi-solid form from the cooled oil. In the wet method, a spray of hot water is directed upon the surface of the oil, washing down the precipitated soap stock.

In accordance with this invention, it has been found that refining losses of oil may be markedly reduced if the alkali-refining is carried out in the presence of urea. In general the economics of the situation determine the upper limits of the amount of urea employed and it appears economically feasible to employ urea in amounts between 0.1 and 0.5 percent by weight, based on the weight of the fatty glyceride stock being treated. Preferably from 0.25 to 0.3 percent by weight of urea has been found suitably effective and most economical at current costs of the ingredients.

The process of the invention is especially applicable to the alkali-refining of soybean oil and cottonseed oil. It may be used in the alkali-refining of glyceride stocks composed of vegetable and animal oils of all types, and mixtures thereof, such as corn oil, peanut oil, linseed oil, sesame oil and tung oil, to mention a few of the vegetable oils; and animal oils, such as sardine, herring or menhaden oils. The process is adapted to the refining and re-refining of either degummed or non-degummed oils.

Any alkali hydroxide may be employed, although sodium hydroxide is most generally used. Also, non-saponifying alkalis, such as sodium carbonate, or tri-sodium phosphate, with saponifying alkalis may be used.

The maximum amount of alkali as NaOH to be used is calculated from the usual formula:

$$\frac{\text{Percent F.F.A.}}{5.2} + 0.54 = \text{percent dry sodium hydroxide.}$$

The urea is dissolved in water or dispersed in the oil prior to the addition of the aqueous-alkaline saponifying medium. Preferably, the urea additive is added to the fatty glyceride stock with agitation about 4–5 minutes prior to the addition of the alkali-refining solution. The temperature of the stock at the time of urea addition does not appear to be material. The urea may be used as a solid or as a concentrated water solution.

EXAMPLE I

The following experiments were performed to determine refining losses with degummed soyabean oil, solvent extracted, and non-degummed cottonseed oil, expeller extracted, being employed as the glycerides under treatment. Urea having 45 percent nitrogen content and of commercial quality was employed in each instance in an amount of 0.3% of urea by weight, calculated on the weight of the glyceride. The urea was dissolved in a very small amount of water to form a concentrated urea solution which, in each instance, was added to the glyceride and the mixture agitated thoroughly. The two urea-oil mixtures were refined using the official cup method, the conventional details of which are well known in the art. In the following table are set forth the determinations derived from these two experiments:

*Table I*

| Fat used | F.F.A., Percent | Percent NaOH used, 12° Bé. | Conc. of NaOH, Bé. | Percent refining loss with no urea in the sample | Percent Urea added | Refining loss with sample containing urea, percent |
|---|---|---|---|---|---|---|
| Degummed Soybean oil, Solvent extracted | 0.4 | 2.0 | 12 | 4.1 | 0.3 | 2.4 |
| Non-degummed Cottonseed oil, Expeller extracted | 1.0 | 7.3 | 12 | 6.2 | 0.3 | 4.1 |

EXAMPLE II

As set forth in Table II following several batches of non-degummed black seed, expeller extracted, crude cottonseed oil were treated according to this invention. Each batch of oil was heated to a temperature of 65° C. in accordance with conventional refining practices. It is my observation that the temperature of the oil stock has no effect on the efficacy of the process employing urea according to this invention. Temperatures may be varied in accordance with actual practices encountered in different refineries. The stated amounts of solid urea were added to the oils in a concentrated aqueous solution and the oil-urea mixture was vigorously agitated, whereupon the caustic solution was introduced and all subsequent refining steps were carried out in accordance with conventional refining practices. All factors such as time under agitation, settling time (dry method refining) and the like were the same for all batches for comparative purposes. With respect to the re-refining results set forth in the accompanying table, the same procedures were used.

practical. For example, in the experiments and treatments reported above, the batch refining method has been employed. It will be readily apparent that similar ad- Table II

| Batch No. | Weight of Glyceride in kgs. | F.F.A., Percent | Refining | | | | Re-Refining | | | |
|---|---|---|---|---|---|---|---|---|---|---|
| | | | Weight in kgs. of 20° Bé. NaOH Solution added | Weight of Urea added in kgs. | Refining Loss, Percent | Color of refined oil, Lov.[1] red | Weight in kgs. of 20° Bé. NaOH sol. added | Weight of Urea added in kgs. | Rerefining loss, Percent | Color of rerefined oil, Lov. red |
| 1 | 5,850 | 1.57 | 365 | -------- | 5.1. | 16 | 40 | -------- | 1.90 | 12.0 |
| 2 | 5,820 | 1.60 | 365 | 15 | 4.0 | 12 | 40 | 15 | 0.45 | 9.0 |
| 3 | 5,800 | 1.45 | 365 | -------- | 5.2 | 16.2 | 40 | -------- | 2.10 | 12.3 |
| 4 | 5,800 | 1.60 | 365 | 15 | 4.1 | 11.8 | 40. | 15 | 0.50 | 9.0 |
| 5 | 5,880 | 1.57 | 365 | 15 | 3.9 | 11.8 | 40 | 15 | 0.40 | 8.7 |

[1] Lovibond—a recognized color standard, higher number indicates darker oils.

EXAMPLE III

Refined batches 6 and 7 set forth in Table III hereafter, were based on the use of expeller extracted ground nut oil. The procedures of heating the oil, adding the urea solutions, agitating, and the addition of the caustic solution were the same for batches 6 and 7 as with the numbered batches set forth in Example II above, with the exception that the soap stock was removed following refining by the well-known wet method.

Table III

| Batch No. | Weight of oil in kgs. | F.F.A. | Weight in kgs. of 22° Bé. NaOH solid added | Weight of urea added in kgs. | Refining Loss, Percent |
|---|---|---|---|---|---|
| 6 | 5,500 | 1.47 | 105 | -------- | 5.1 |
| 7 | 5,510 | 1.45 | 105 | 15 | 2.2 |

Further advantage which is achieved using urea in accordance with the invention, in addition to reduced oil losses as indicated hereinbefore, is an improved resistance to color reversion, an advantage not amenable to ready explanation except that the same is inherent as a result of the invention herein disclosed. Moreover, the presence of urea during the refining process does not, in any way, affect other operations which may be carried out in the further processing of the refined oil as, for example, the refined oil produced in the presence of urea may be hydrogenated in precisely the same manner as the ordinary refined oil.

The analyses reported above in Example I are in accordance with the methods specified in "Oil and Soap" volume 19, pp. 97–103 (1942), entitled "American Oil Chemists Society Official and Tentative Methods" described in an article written by A. E. Bailey, R. O. Feuge and W. G. Bickford. The results reported in Examples II and III and the tables thereto are in accordance with commercial practices.

It will be understood that the foregoing examples are by way of illustrating typically the application of the invention to the refining of fatty glyceride stocks and it is intended to thereby not limit the same to the specific details as to oils employed and the refining methods practiced since it will be apparent to those skilled in the art that many variations and modifications will be equally vantages may likewise be gained when the invention is practiced in connection with the well-known continuous method for removing soap stock. The scope of this invention is intended to be that of the subjoined claims and their equivalents.

What is claimed is:

1. A process of refining a fatty glyceride stock which comprises treating the stock with aqueous alkali solution to neutralize free fatty acids contained in said stock in the presence of from 0.1–0.5% by weight of urea based on the weight of said fatty glyceride stock, and then separating soapstock from the refined oil.

2. A process as recited in claim 1, in which the soapstock and refined oil are formed into separate layers by settling.

3. A process as recited in claim 1, in which the fatty glyceride is a soybean oil.

4. A process as recited in claim 1, in which the fatty glyceride is a cottonseed oil.

5. A process as recited in claim 1, in which the urea is added in an amount of from 0.25–0.3% by weight.

6. A process as recited in claim 1, in which the aqueous alkaline solution is used in an amount at least sufficient to neutralize the free fatty acids contained in said stock.

7. A process of refining a fatty glyceride stock which comprises treating the stock with aqueous alkali solution in an amount sufficient to neutralize the free fatty acids contained in said stock, adding to said stock prior to addition thereto of said alkali solution from 0.1–0.5% by weight of urea, based on the weight of said stock, and then settling the mixture so-produced to form a refined oil layer and a soapstock layer.

8. A process as recited in claim 7, in which said urea is added to said stock in an amount of from 0.25–0.3% by weight about 4–5 minutes prior to addition to said stock of said alkali solution.

References Cited in the file of this patent

UNITED STATES PATENTS 2,281,884     Lachle     May 5, 1942
2,598,953     Weitkamp et al.     June 3, 1952

OTHER REFERENCES

Chemical Abstracts, vol. 49, No. 16, Aug. 25, 1955, column 11303.